(12) United States Patent
Dietz et al.

(10) Patent No.: US 8,776,613 B2
(45) Date of Patent: Jul. 15, 2014

(54) ULTRASONIC MEASUREMENT APPARATUS HAVING A DEFLECTION UNIT FORMING A LOOP

(75) Inventors: Toralf Dietz, Dresden (DE); Gerry Schröter, Dresden (DE); Andreas Gurr, Dresden (DE)

(73) Assignee: Sick Engineering GmbH, Ottendorf-Okrilla (DE)

( * ) Notice: Subject to any disclaimer, the term of this patent is extended or adjusted under 35 U.S.C. 154(b) by 540 days.

(21) Appl. No.: 13/049,323

(22) Filed: Mar. 16, 2011

(65) Prior Publication Data

US 2011/0226068 A1   Sep. 22, 2011

(30) Foreign Application Priority Data

Mar. 18, 2010  (EP) ..................... 10156936

(51) Int. Cl.
*G01F 1/66* (2006.01)
*G01F 15/18* (2006.01)

(52) U.S. Cl.
CPC .............. *G01F 1/667* (2013.01); *G01F 15/18* (2013.01); *G01F 1/662* (2013.01); *G01F 15/185* (2013.01)
USPC ...................................................... 73/861.28

(58) Field of Classification Search
USPC ...................................................... 73/861.28
See application file for complete search history.

(56) References Cited

U.S. PATENT DOCUMENTS

| | | | | |
|---|---|---|---|---|
| 4,616,510 A | * | 10/1986 | Moore | 73/861.27 |
| 4,977,915 A | * | 12/1990 | Marrelli | 137/4 |
| 5,309,946 A | * | 5/1994 | Ligneul | 138/39 |
| 5,597,961 A | * | 1/1997 | Marrelli | 73/861.04 |
| 6,343,516 B1 | * | 2/2002 | Marrelli | 73/861.04 |
| 7,228,750 B2 | * | 6/2007 | Brandt, Jr. | 73/861.63 |
| 7,237,441 B2 | * | 7/2007 | Umekage et al. | 73/861.27 |
| 7,340,965 B2 | * | 3/2008 | Mehendale et al. | 73/861.355 |
| 7,383,740 B2 | * | 6/2008 | Krasilchikov et al. | 73/861.19 |
| 2002/0092362 A1 | | 7/2002 | Tonge et al. | |
| 2006/0191827 A1 | * | 8/2006 | Fritze | 210/87 |
| 2009/0044599 A1 | * | 2/2009 | Owen | 73/28.04 |
| 2009/0049926 A1 | * | 2/2009 | Mattar et al. | 73/861.24 |
| 2009/0205400 A1 | * | 8/2009 | McPeak | 73/1.16 |
| 2011/0023621 A1 | * | 2/2011 | Augenstein et al. | 73/861.18 |

FOREIGN PATENT DOCUMENTS

| | | |
|---|---|---|
| DE | 10 2004 044 607 A1 | 3/2006 |
| EP | 0 566 859 A1 | 10/1993 |
| EP | 2 146 189 A1 | 1/2010 |
| WO | 2008/009870 A1 | 1/2008 |
| WO | WO 2008009870 A1 * | 1/2008 |

* cited by examiner

*Primary Examiner* — Harshad R Patel
(74) *Attorney, Agent, or Firm* — Nath, Goldberg & Meyer; Jerald L. Meyer; Sanjana Mangalagiri

(57) ABSTRACT

An ultrasonic measurement apparatus (10) for measuring the flow velocity of a fluid is provided which flows in a pipeline in a main flow direction, wherein the ultrasonic measurement apparatus (10) has an ultrasonic measurement zone (36) with at least a pair of ultrasonic transducers (38), an evaluation unit for determining the flow velocity from a propagation time difference of ultrasound transmitted and received with and against the flow, as well as a deflection unit, by means of which the fluid from the main flow direction is deflectable and suppliable to the ultrasonic measurement zone (36). In this respect the deflection unit (20, 26, 32) forms a loop.

12 Claims, 9 Drawing Sheets

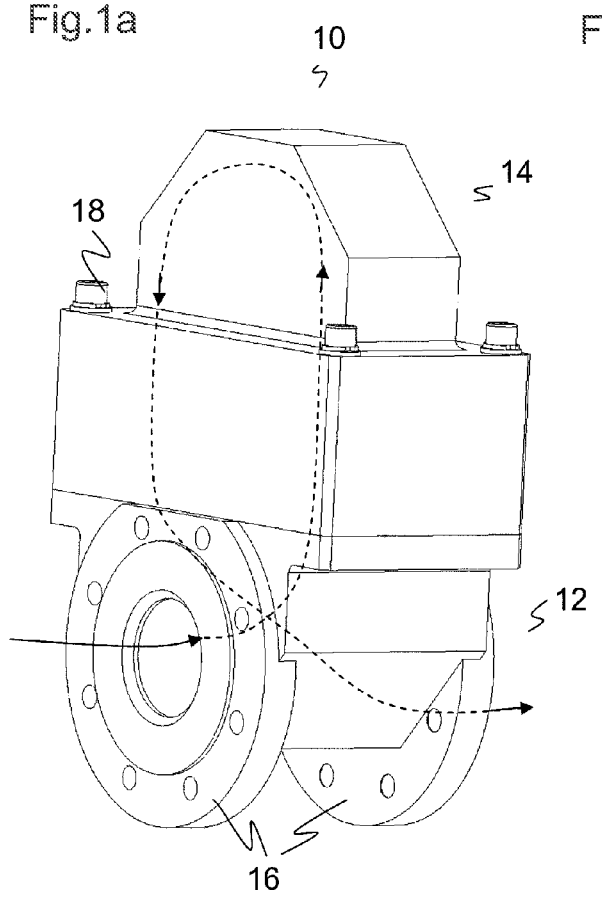
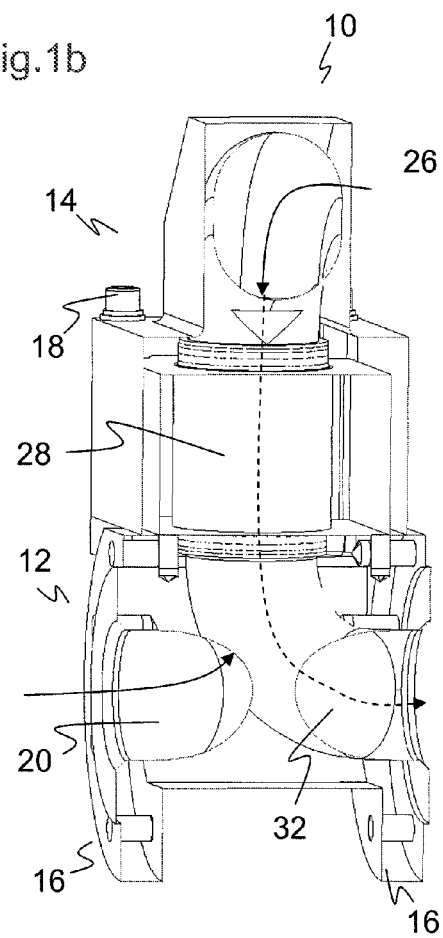
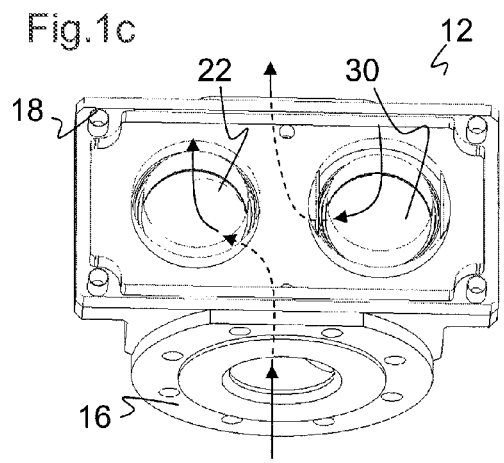
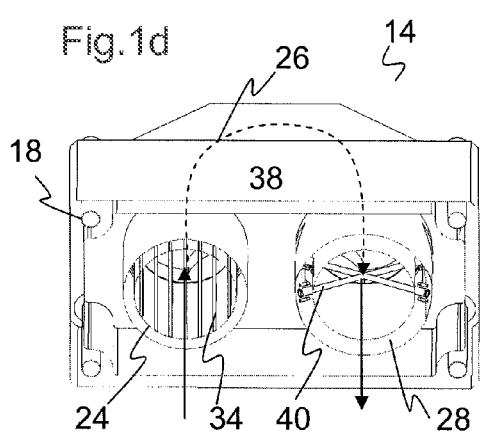

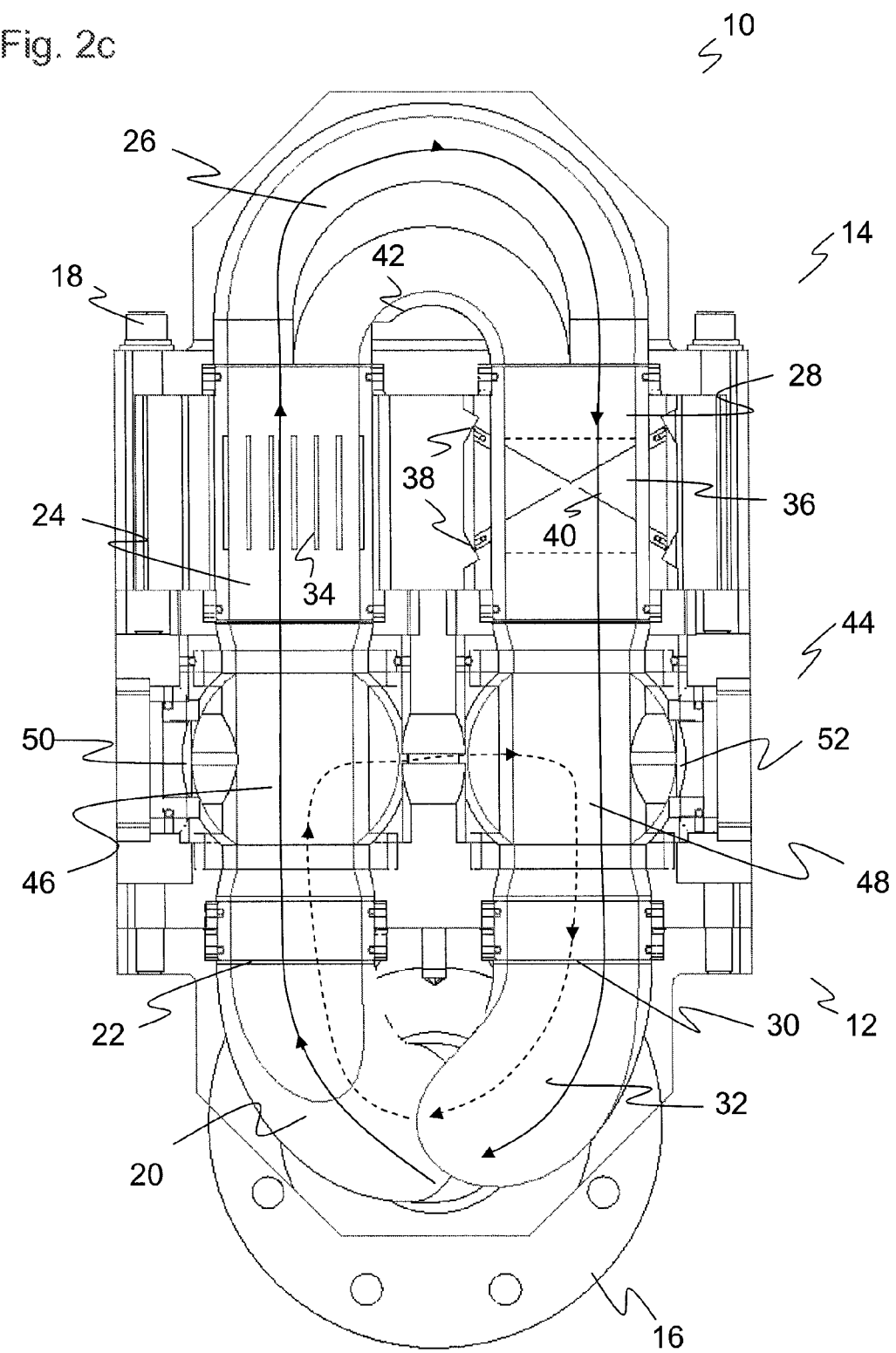

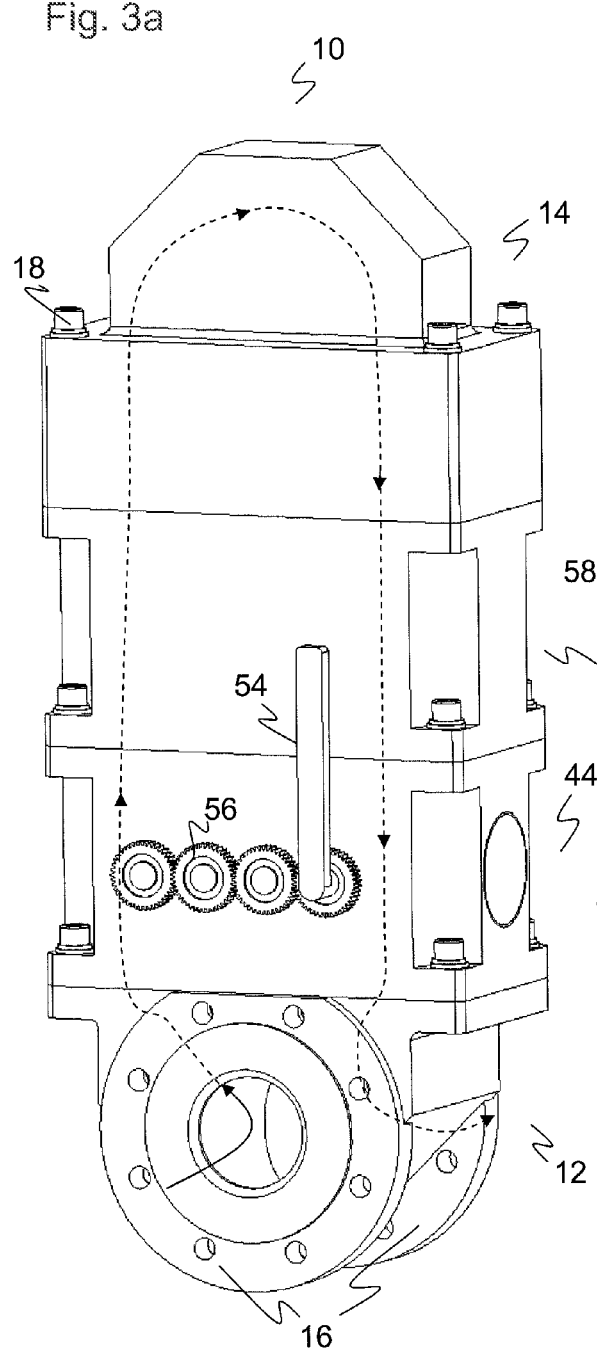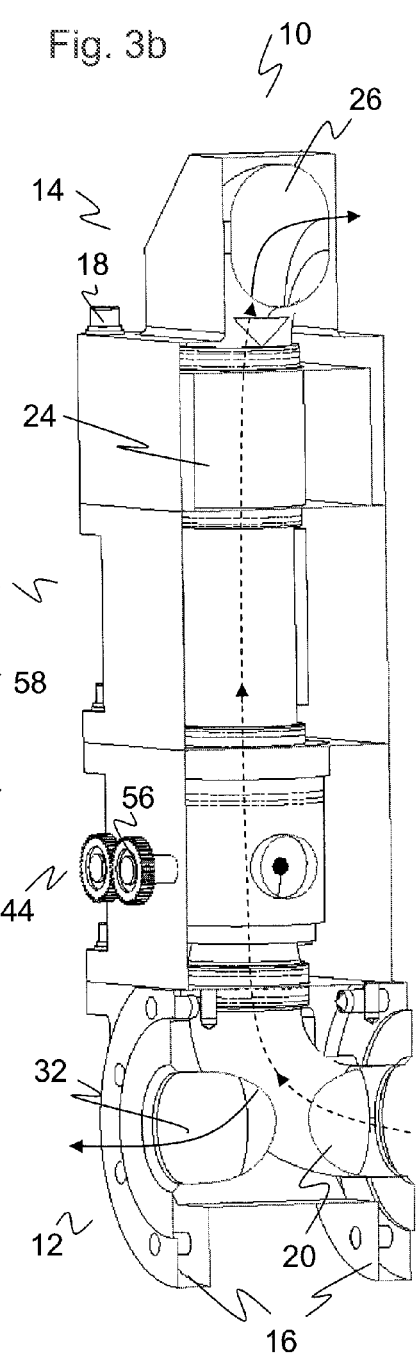

ULTRASONIC MEASUREMENT APPARATUS HAVING A DEFLECTION UNIT FORMING A LOOP

The invention relates to an ultrasonic measurement apparatus and to a method for the measurement of the flow velocity.

Fluid velocities in pipelines and passages can be determined by means of ultrasonic measurement techniques in accordance with the propagation time difference method. In this respect ultrasonic pulses are transmitted and received by a pair of ultrasonic transducers which are oppositely disposed at walls of the pipeline, at the end of a measurement path, transverse to the flow direction of the fluid. The flow velocity is determined in the flow direction and in the opposite direction against the flow from the propagation time difference of the ultrasound in the measurement path. In this respect the ultrasonic transducers alternatively work as a transmitter and as a receiver. The ultrasonic signals transported by means of the fluid are accelerated in the flow direction and are decelerated against the flow direction. The resulting propagation time difference is calculated to a mean flow velocity with reference to geometric quantities. An operation volume flow also results which is frequently the interesting measurement quantity for fluid calculated by volume from the cross-sectional area.

Figure 7:
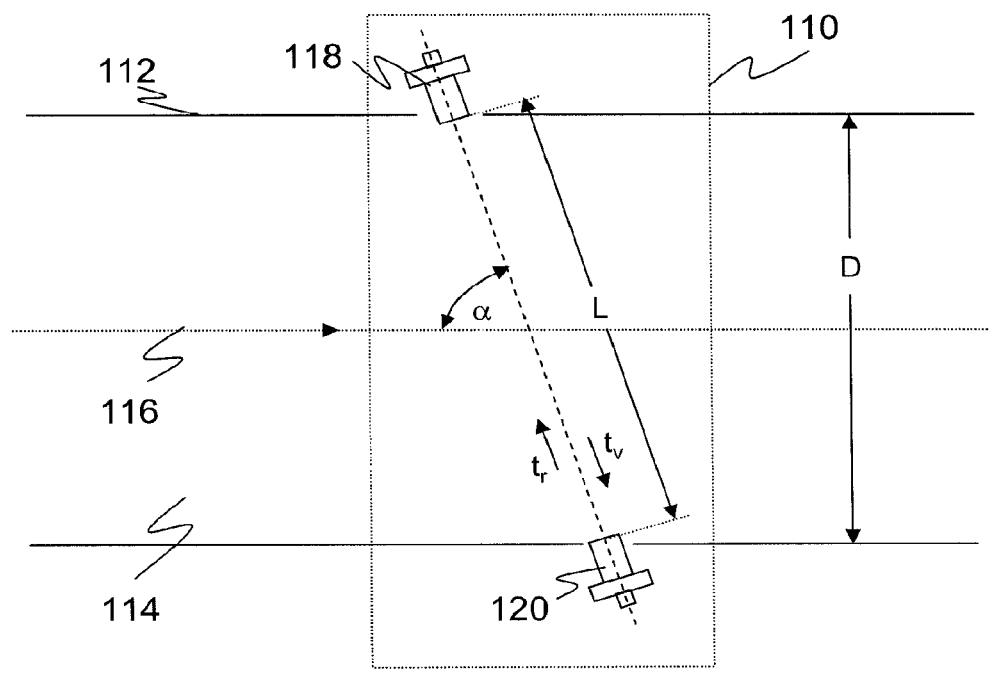

This known measurement principle is illustrated in FIG. 7. As an essential component of a common measurement apparatus 110 two ultrasonic transducers 118, 120 are arranged at an angle in the walls of the pipeline 112 in which a fluid 114 flows in the direction of the arrow 116. The ultrasonic transducers 118, 120 alternatively work as transmitters and as receivers. The ultrasonic signals transported by the gas are accelerated in the flow direction and are decelerated against the flow direction. The resulting propagation time difference is calculated to a mean flow velocity with reference to geometric sizes. The operational volume flow results from the cross-sectional area. The geometric ratios are described by the following variables:

| | |
|---|---|
| v: | flow velocity of the fluid in the pipeline |
| L: | length of the measurement path between the two ultrasonic transducers |
| α: | angle, at which the ultrasonic transducers transmit and receive |
| Q: | volume flow |
| D: | diameter of the pipeline |
| $t_v$: | propagation time of the ultrasound with the flow |
| $t_r$: | propagation time of the ultrasound against the flow |

From this the following relationships result for the sought after quantities v and Q:

$$v = L/(2 \cos \alpha)(1/t_v - 1/t_r) \text{ and}$$

$$Q = v \cdot \tfrac{1}{4} D^2 \pi.$$

An important and challenging field of application is gas counters for natural gas pipelines where the smallest deviations in the measurement accuracy already lead to significant marked values due to the immense amount of gas conveyed and the value of the raw material. Ultrasonic flow meters are increasingly being used in the field of large quantity gas measurement due to their measurement accuracy, freedom from maintenance, and self-diagnostic possibilities on gas transport and gas storage. In the field of distribution, however, the cost pressure with regard to established technologies such as turbine wheel flow meters and rotary displacement gas meters is still too high.

To satisfy the requirements for measurements subject to legal control with regard to the achieved accuracy, a very high effort in work and cost is namely required. As an ultrasonic measurement path only scans the flow velocity at defined positions, the mean flow velocity is subsequently only extrapolated for the overall cross-section. For this reason, higher accuracies can only be achieved when the flow can be reproduced well and/or when an undisturbed flow profile is present or when a plurality of measurements paths is capable of resolving these irregularities. To achieve higher accuracies, the flow profile can be influenced specifically, for example by means of flow rectifiers or long, straight inlet paths. However, the flow rectifiers are only in the position to uniformly establish the flow in a limited manner and long, straight inlet paths require a lot of construction space and are not always available. A measurement at a plurality of measurement paths requires a correspondingly complex measurement apparatus.

Particularly in the use of ultrasonic measurement apparatus in the field of distribution the installation typically occurs in gas pressure regulating stations, in which the medium pressure or high pressure of the transport pipeline is reduced to the low pressure or medium pressure of the distributor network. This reduction occurs via regulating valves and such components produce interference sound in the ultrasonic region which can be superimposed onto the actual measurement signals and thus influence the measurement accuracy.

This generally means that the user of common ultrasonic measurement apparatus has the disadvantage that additional installations have to be carried out which bring about increased costs and component sizes.

Beside the ultrasonic measurement technique, mechanical turbine wheel gas meters or rotary displacement gas meters are used for gas measurement. Also variants are present, in which the flow is deflected for the counter and redirected into the pipeline following the measurement. The formation of the flow is generally indifferent for mechanical measurements so that the interference of the original flow and flow direction can be considered without a problem. For ultrasonic counters one, however, always strives to mount these preferably following a very long and straight calming section so that the flow can be made uniform and to support the flow by means of the flow rectifier. Furthermore, the ultrasonic counters themselves are also mounted and configured such that the fluid can flow as freely and undisturbed as possible.

The mechanical mode of measurement of these counters, moreover, has the disadvantage that they are movable and thus susceptible and prone to wear parts are arranged directly in the flow. Furthermore, the diagnostic properties are missing which can be achieved in the ultrasonic counter by monitoring additional measurement quantities. The status of the measurement apparatus or the measurement process can thus not be monitored and analyzed and/or a very cost-demanding and time-demanding examination is respectively required for this. Due to the lacking diagnostic possibilities and thus the lacking control over the measurement accuracy this is unsatisfactory for the operator already because small deviations in accuracy can correspond to high values.

From DE 10 2005 062 629 A1 an ultrasound-based water counter for domestic use is known. In this respect the water is radially deflected from the flow and guided through a measurement chamber back into the flow via an exit region. The measurement chamber forms a ring whose plane lies parallel to the flow direction in the pipeline. Ultrasound propagates through the ring with the aid of numerous elaborately deflecting reflectors. The measurement chamber is provided with a plurality of elaborately drafted protrusions and openings to generate a uniform ring flow which in accordance with the teaching of DE 10 2005 062 629 A1 should also ensure that the reflectors are ideally scavenged to prevent air bubbles so that the measurement is not influenced. The design of the measurement chamber and thus of the flow paths and of the sound paths in its interior are thus very elaborate. Additionally to the costs which such components bring about, the ultrasonic measurement must also be set extremely accurately to these complicated parts on the use of the common ring principle in gas pipelines, wherein one can only fall back on the experiences of common ultrasonic measurement devices, which are directly arranged in the non-deflected main flow, in a limited manner.

U.S. Pat. No. 4,506,552 describes an ultrasonic through-flow measurement device for highly viscous and/or deeply cold fluids. To prevent bubbles due to temperature gradients and the resulting turbulences the measurement path lies within a double tube so that fluid also flows in the outer wall and thus simultaneously causes a cooling of the measurement path. In a variant the coaxial flow path is guided in a superimposed pipe part.

DE 29 24 561 B1 shows a counter for a domestic water supply having an ultrasonic measurement path which in a variant lies perpendicular to the flow direction of the water line, in that a 90° pipeline part directs the water to the measurement path and a corresponding 90° pipeline part redirects the water back into the waterline.

EP 1 227 303 A2 shows a further ultrasonic through-flow counter, in which the fluid is deflected from the line and is deflected into a measurement path extending parallel to the line. The measurement capsule can be mounted to a common fitting when used as a water counter.

In EP 1 909 076 A1 a similar basic construction for a through-flow meter is illustrated whose measurement capsule is attached to a connection fitting and in which an ultrasonic measurement path is realized in a pipe parallel to the actual line.

U.S. Pat. No. 4,140,012 discloses an ultrasonic through-flow meter in which the measurement path is perpendicular and centrally arranged within the actual line which is increased in diameter in the region of the measurement path while a deflector standing at a 45° angle forces the fluid to flow through the measurement path by means of a two-time perpendicular change in direction.

In EP 2 146 189 A1 the flow passage has sharp deflections and abrupt changes in cross-section in an axial embodiment. This has undesired consequences for an ultrasonic measurement. The flow falls off in the ultrasonic measurement path, back flow regions arise which lead to instable measurement values, and strong turbulences which complicate the signal evaluation. Moreover, the pressure loss is very high due to the flow supply. As the allowable pressure loss of the measurement device is limited no pressure reserve remains for a flow conditioning. The ultrasonic transducers are finally arranged in the interior of the inflow region so that the electric contacting has to be achieved by the flowing gas. This requires pressure-resistant feed-throughs.

A further disadvantage of common ultrasonic measurement apparatuses is the type of fitting. The ultrasonic measurement device is typically flanged in place instead of a pipeline section. An exchange or maintenance is correspondingly elaborate. Such maintenances are also required to regularly check and recalibrate the ultrasonic measurement device subject to legal control. In this respect the calibration has to take place in a particular high pressure test stand which by no means has to be in close proximity to the position of operation. In this respect, the complete counter including the pressure-stable housing has to be removed from the line be sent in and then be reinstalled. An interim operation is only possible when a replacement part calibrated specifically for this position of application is installed.

Figure 8:
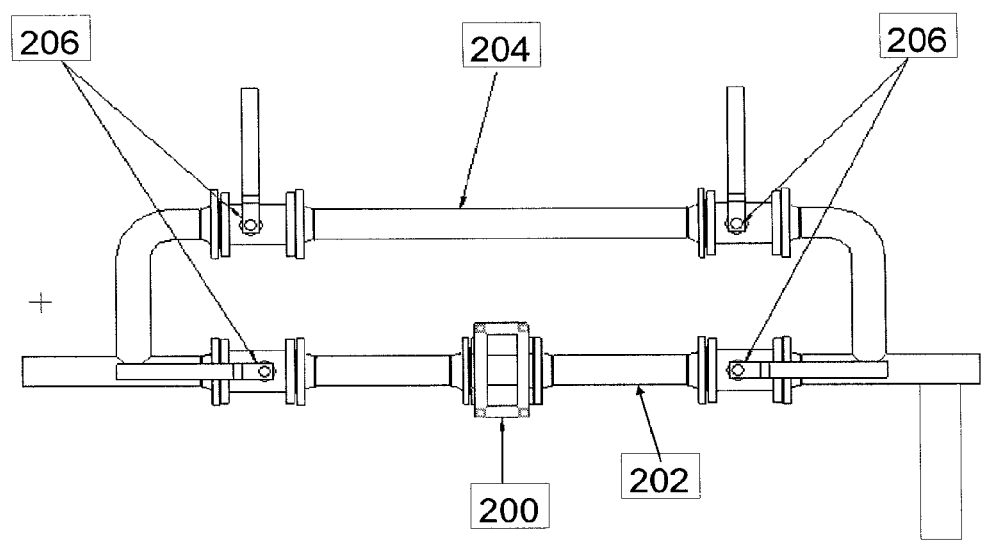

FIG. 8 illustrates the common maintenance of an ultrasonic measurement apparatus 200. For this purpose the pipeline section 202 is interrupted or switched pressure-free. To further ensure the supply continues during this time, a redundant second line 204 is provided. By changing the barriers 206 the gas flow is supplied from the pipeline section 202 into the second line 204 and vice versa.

Through the redundant line construction considerable additional costs arise. The additional cost is particularly uneconomical as the replacement line is only infrequently used. The typical period of use of the ultrasonic measurement apparatus 200 is five or more years and during the maintenance or an exchange of the ultrasonic measurement apparatus 200 the use of a recalibrated replacement part only takes a few hours.

Following the maintenance the pipeline section 202 has to be re-impinged with pressure. As in natural gas supply lines explosive and pressurized media are transported, significant safety measures have to be considered and only specifically trained personal can be used. For this reason high costs are commonly associated with the maintenance works.

From DE 10 2007 028 431 A1 an ultrasonic counter based on a exchangeable use is known. The problem of how a pressurized line can be exchanged during its use is, however, not solved.

EP 2 146 189 A1 also mentions an exchangeable measurement use. During whose reinstallation it must, however, be ensured that the overall gas flows through the measurement section. Due to the inner lying measurement section a leak tightness has to be evidenced between the inflow and the outflow in a very elaborate manner.

For this reason it is the object of the invention to enable an accurate and simple ultrasonic measurement of flow velocities.

This object is satisfied by an ultrasonic measurement apparatus for measuring the flow velocity of a fluid which flows in a pipeline in a main flow direction, wherein the ultrasonic measurement apparatus has an ultrasonic measurement zone with at least a pair of ultrasonic transducers, an evaluation unit for determining the flow velocity from a propagation time difference of ultrasound transmitted and received with and against the flow, as well as a deflection unit, by means of which the fluid from the main flow direction is deflectable and suppliable to the ultrasonic measurement zone, wherein the deflection unit forms a loop.

In a further aspect this object is satisfied by a method for measuring the flow velocity of a fluid which flows in a pipeline in a main flow direction, wherein the flow velocity is determined from a propagation time difference of ultrasound transmitted and received with and against the flow from a pair of ultrasonic transducers in an ultrasonic measurement zone, wherein the fluid is deflected from the main flow direction and supplied to the ultrasonic measurement zone for the measurement, wherein the ultrasonic measurement takes place whilst the fluid is deflected such that it flows in a loop.

In this respect the solution in accordance with the invention is based on the basic idea that fluid from a main flow direction in the pipeline is to be deflected, for example, into a stub-like attachment. In this respect the flow is only deflected by a highest angle at each lined section and remains as untouched as possible in its cross-section. This is achieved by a loop i.e. in a visible manner in a looping or at least in a flow path which describes a 360° spatial curve. In this way the flow can be measured independently from the line section downstream of the ultrasonic measurement apparatus and thus very reproducible. On the other hand, the ultrasonic measurement region is significantly more accessible.

The solution in accordance with the invention has the advantage that the measurement position is reproducibly, acoustically decoupled from the flow profile present at the input of the measurement device and at the same time an acoustic insulation with respect to previously connected interference sound sources is achieved, for example, with regard to pressure-regulating valves. Only a marginal pressure loss arises so that sufficient pressure reserves are present for a flow conditioning. The ultrasonic measurement apparatus has a very small installation length and due to its reproducible flow properties makes do with a minimum number of ultrasonic measurement paths.

In this respect all advantages of the ultrasonic measurement with respect to mechanical measurement principles such as rotary displacement gas meters or turbine wheel counters is achieved including all of the previously mentioned advantages such as stable measurement values for a large through-flow region. The flow supply in accordance with the invention enables a modular construction of the ultrasonic measurement apparatus. In this respect a pressurized or a pressure-free ultrasonic measurement region and/or an ultrasonic measurement region for high pressure and low pressure can be designed with free constructive layout in view of the material selection, wall thicknesses and type of ultrasonic transducer. As the ultrasonic measurement region is easily accessible, the tightness both for the environment and also between the inflow and the outflow can be easily accounted for. Furthermore, the ultrasonic transducers themselves are easily accessible and thus simply and cost-effectively contactable. Despite of these advantages the ultrasonic measurement apparatus allows a construction which can be manufactured cost-effectively.

The loop preferably has a first deflector, an inflow region, an arc, an outflow region and a second deflector so that fluid from the main flow direction is deflectable into the inflow region by means of the first deflector is deflectable from there into the outflow region and subsequently is deflectable back into the main flow direction by means of the second deflector, wherein, in particular, the first deflector and the second deflector form a right angle, and the arc forms an angle of 180°. All these angles must not necessarily be accurately abided to, for example, for the deflections also an angular region of 80°-100° or even a larger angular region is plausible. For such deviations, however, abrupt changes of direction and as a whole a too unwieldy construction design should be prevented. Corresponding angular deviations are also plausible for the 180° arc. In this respect the angles must add up to 360° so that the fluid can flow again in the main flow direction following the flow through the ultrasonic measurement apparatus. A small contribution to this overall angle can also be made by the inflow regions and the outflow regions which could deviate from a straight shape. It should, however, be noted that the loop is a three-dimensional geometric form so that the condition of flowing longitudinally and transversely back into the initial direction must be satisfied.

The inflow region and the outflow region preferably each have a partial region arranged adjacent to one another and are aligned in parallel to one another, wherein, in particular, a plane, which includes both straight partial regions, is perpendicular to the main flow direction. Within the inflow region and the outflow region thus no interfering flow deflections are present. Through the parallel arrangement the flow cross-section can be maintained constant in contrast, for example, to a concentric arrangement. In that the mentioned plane is arranged in the mentioned manner, a loop practically arises both in the longitudinal direction and also in a direction transverse to the direction of the pipeline. Thus a particularly uniform and symmetric flow supply and a particularly compact construction of the ultrasonic measurement apparatus can be achieved.

The loop is preferably designed smooth and without sharp changes in direction or constrictions, wherein, in particular, the arc has a wall contour which causes a specific flow break-away in a zone uncritical for the ultrasonic measurement. A sufficiently calm flow profile can thus be formed in the ultrasonic measurement region. Furthermore, the pressure loss remains minimal. The specific wall contour in the arc causes a specific flow break-away in a region uncritical for the ultrasonic measurement. In the ultrasonic measurement region a uniformation of the flow profile is achieved and interfering swells and backflow regions are prevented. Thus also a measurement for high flow velocities and thus a significant enlargement of the measurement region is possible.

A flow rectifier is preferably provided in the inflow region and/or in the outflow region. This additionally ensures a reproducible flow and thus, a higher measurement accuracy. In particular on arrangement in the inflow region sufficient space also for more complex flow rectifiers is available and also sufficient path length is available for a uniformation due to the subsequent flow path up to the ultrasonic measurement path. Due to the flow supply in accordance with the invention sufficient pressure reserves are present for the flow rectifier.

The ultrasonic measurement zone is preferably provided in the outflow region, in particular with sufficient separation to the arc so that the flow is reproducibly stabilized on entry into the ultrasonic measurement zone. In this respect even more preferably straight partial sections are arranged before the outflow region and/or following the ultrasonic measurement zone. At the point in time of the ultrasonic measurement the fluid has then already passed a substantial portion of the loop and is thus particularly effectively decoupled from interferences upstream from the ultrasonic measurement apparatus. This is even truer when a flow rectifier is arranged in the inflow region. Additionally or alternatively, however, a flow rectifier can also be arranged in the outflow region.

The ultrasonic transducers are preferably arranged in the ultrasonic measurement zone such that the transmitted and the received ultrasound has at least a component in a direction transverse to the flow. In this way the ultrasonic transducers can be mounted sidewise. The counter-part to such an embodiment with a measurement transverse to the flow are ultrasonic transducers which are arranged longitudinally, for example, at the top of the output of the arc and at the bottom of the flow output. This is ineffective because non-calming flow parts are introduced into the measurement which leads to less accurate and less reliable measurement values.

The ultrasonic measurement apparatus preferably has a pipe shaped base piece having connection regions, in particular flanges for the pipeline which includes the first deflector and the second deflector. This base piece is compatible to the standard insertion length, for example of turbine wheel counters or of rotary displacement gas meters and are manufactured in different nominal width and with different connection flanges which are required for the respective pipeline. Following the mounting the base piece constantly remains in the pipeline and can thereby be separable functionally and constructively from the measurement section as a base housing. Thus a simple to manufacture and assembly-friendly measurement attachment can be manufactured.

The ultrasonic measurement apparatus preferably has at least one add-on module which each have an extension piece for the inflow region and an extension piece for the outflow region and which are connectable to the base piece or to the outflow region and which are connectable to the base piece or to any other add-on module and are separable from the base piece or from the other add-on module, wherein a final add-on module includes the arc. In the embodiment having the lowest number of add-on modules only the single final add-on module is thus provided with the arc. In the final add-on module, the extension pieces can also only be provided in a suggested manner and be provided as very short.

Through the add-on modules additional component groups can be mounted depending on their need. These can, for example, enable a deflection of the flow, cause an additional conditioning of the flow or enable additional measurement tasks. The outer dimensions of the ultrasonic measurement apparatus in the pipe axis, i.e. in the main flow direction are not changed through the add-on modules, as the actual installation length is determined purely through the geometric dimensions of the base piece. For this reason, the ultrasonic measurement apparatus can be installed compatible to the gas counters users used so far. The add-on modules can be exchanged simply and upwardly without the base piece having to be removed from the pipeline. The flow direction in the ultrasonic measurement apparatus is characterized primarily by the loop within the add-on module and can for this reason be largely freely designed without having to interact within the pipeline. The modular construction comprising a base piece and add-on modules allows a flexible and cost-effective manufacture, mounting, change and maintenance of the ultrasonic measurement apparatus.

The ultrasonic measurement apparatus preferably includes at least one add-on module designed as a measurement module having the ultrasonic measurement zone and, in particular also includes the flow rectifier. The measurement module can be pre-calibrated outside of the pipeline. On an exchange of the ultrasonic measurement apparatus the base piece then remains the pipeline and the present measurement module is exchanged against a pre-calibrated measurement module. The design of the ultrasonic measurement zone and of the flow conditioning is thus independent from the base piece and can arbitrarily be varied. The measurement value can be configured identically for each nominal width of the pipeline, although, on the other hand, also adaptations are plausible. Further, or alternative measurement modules can be provided, for example a redundant measurement module for the duration of the exchange, but also different measurement modules for different pressure conditions, for other combinations of the fluid and such like.

The ultrasonic measurement module preferably has an add-on module configured as a bypass module having a transverse line between the inflow region and the outflow region or a transverse line integrated into the base piece, wherein a bypass deflector is provided which in one position selectively closes the flow to the transverse line and from the transverse line and releases the flow to the inflow area and from the outflow area and in another position selectively closes the flow to the inflow region and from the outflow region and releases the flow to the transverse line and from the transverse line. With the aid of the transverse line the volume flow can be deflected such that a different add-on module is mountable and demountable in a pressure-free manner, for example, as a measurement module. The fluid flow, for example, the gas flow to the user is in this respect not interrupted. Thus additional constructive measures at the pipeline, such as blocking devices, bypass lines, venting means or such like can be omitted and this leads to a considerable reduction of the plant costs. During the maintenance work the pipeline itself remains pressurized at the operational pressure. As no venting and filling of the pipeline section to be maintained is required, the duration of the maintenance is reduced. Furthermore, because the base piece remains in the pipeline no elaborate tightness tests are necessary on restarting the stretch of the pipe. In this respect the bypass line can be integrated into the base piece. Alternatively, an individual bypass module can be provided.

The bypass module is configured such that during measurement operation the flow to the remaining modules and, in particular to the measurement module is hardly influenced. Through this no additional measures in these modules is necessary to ensure their faultless function and an undisturbed measurement. Because of the modular setup the bypass module fits to the other add-on modules or to the base piece. Also a subsequent fitting of the bypass module into an already installed ultrasonic measurement apparatus is possible.

The bypass deflector is preferably configured on the principle of a three way tap, in particular has two spheres perforated in T-shape with seals which are coupled amongst one another and are thus commonly transferable from the one position into the other position. The selected deflection of the flow in the transverse line, for example, for the exchange of an add-on module arranged above or back in the overall loop of the ultrasonic apparatus is very easily and reliably possible, for example by means of a lever at the outer side. The simple actuation of the spherical tap-like construction does not require any in-depth knowledge and for this reason an exchange of add-on modules is also possible with lesser trained safety technical personal. Alternatively to a bypass deflector working on the principle of a three way tap, other forms of valves, gates, flaps and such like are plausible.

The ultrasonic measurement apparatus preferably has an add-on module configured as a calibration module with at least one pair of ultrasonic transducers for a plausibility check or calibration of the measurement values of the ultrasonic measurement zone. The calibration module therefore serves as a reference module or a measurement module.

Preferably the use of the ultrasonic measurement apparatus in accordance with the invention is as a gas counter in a gas pipeline. In this respect the mentioned advantages are particularly effective to ensure a reliable measurement independent, as far as possible, from the position of operation and to ensure that the measurement is sufficient to be subjected to legal control.

The method in accordance with the invention can be furthered in a similar manner and in this respect has similar advantages. Such advantageous features are exemplary but not conclusively described in the dependent claims dependent on the independent claims.

Figure 1E:
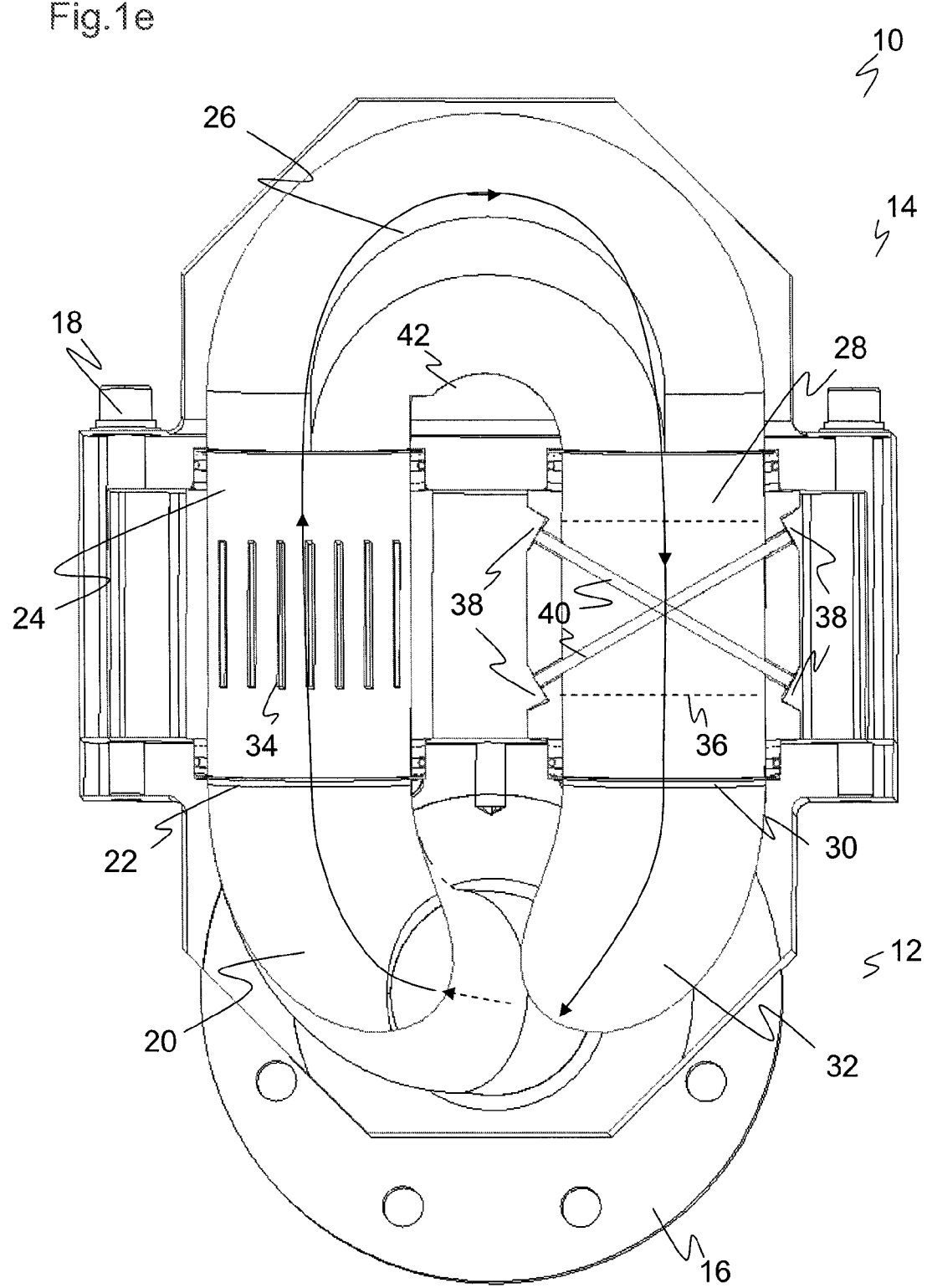
Figure 2A:
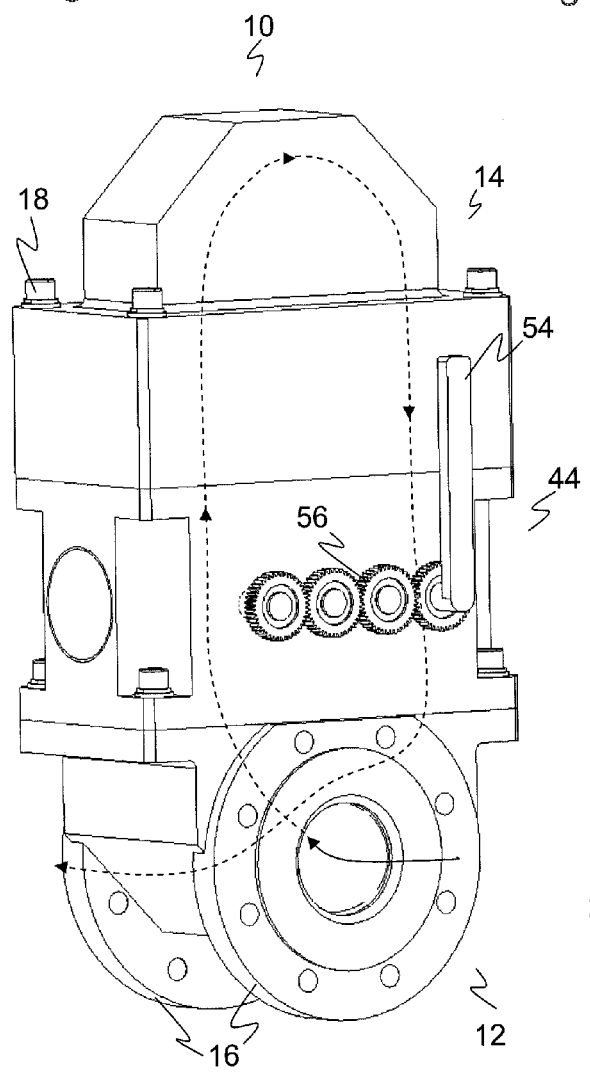
Figure 2B:
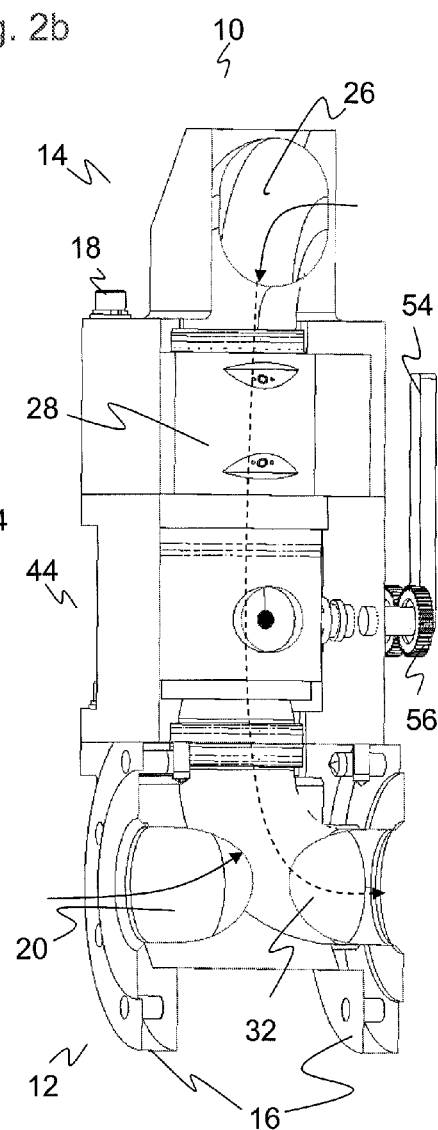
Figure 3C:
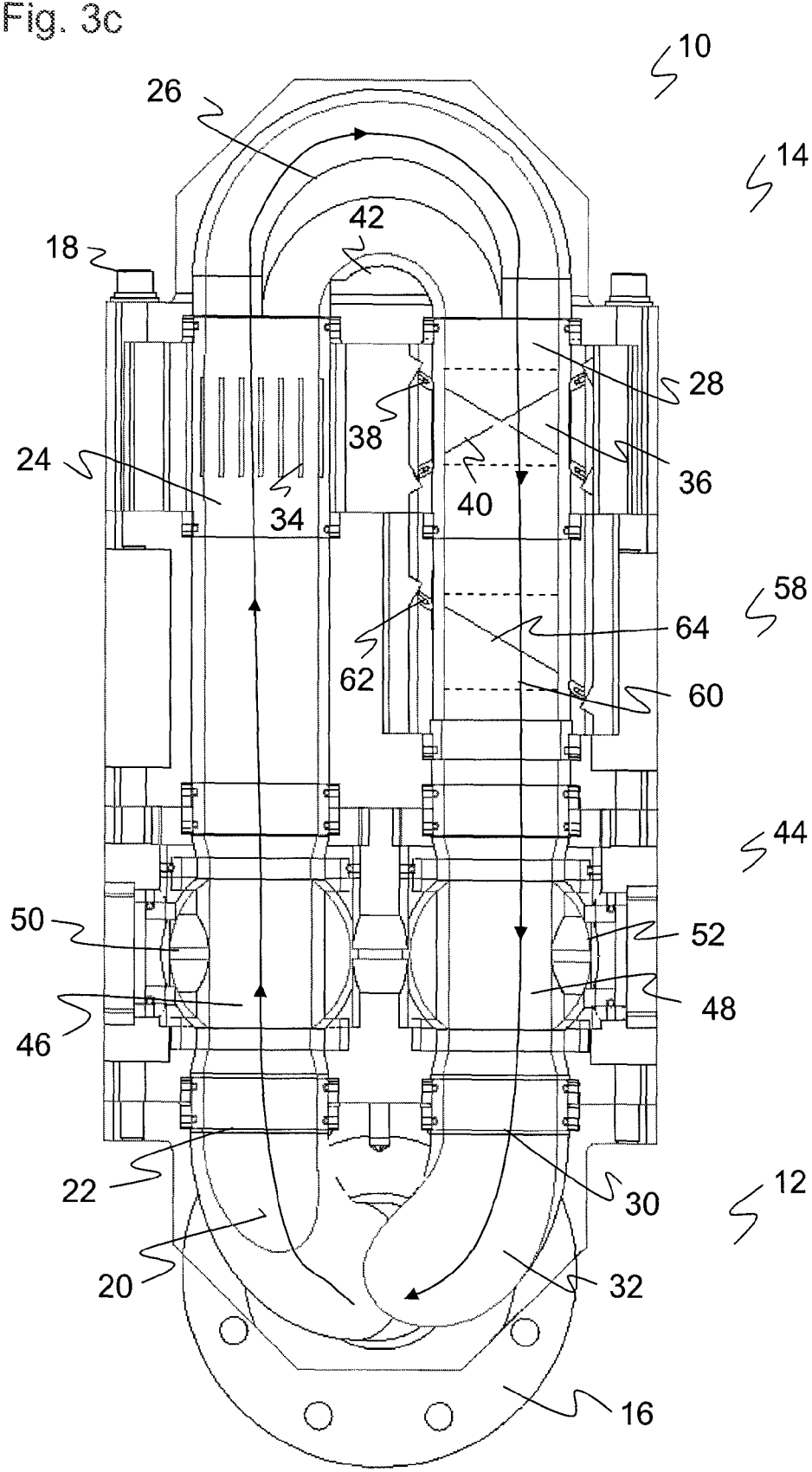
Figure 4A:
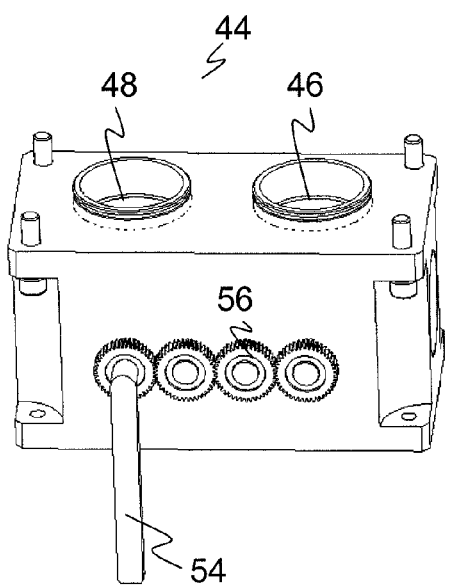
Figure 4B:
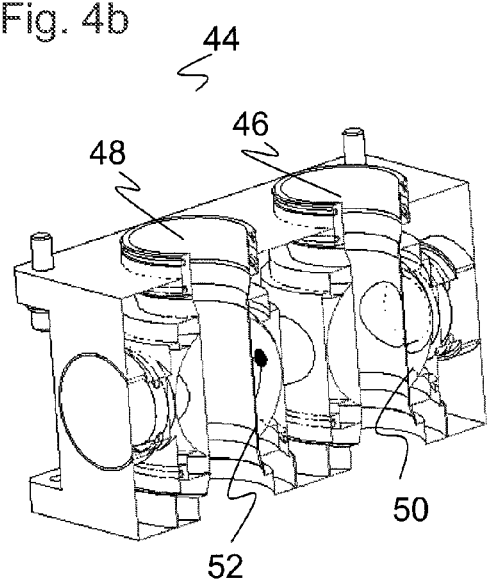
Figure 5A:
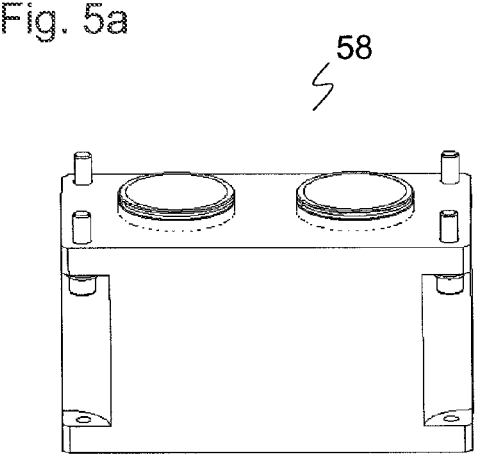
Figure 5B:
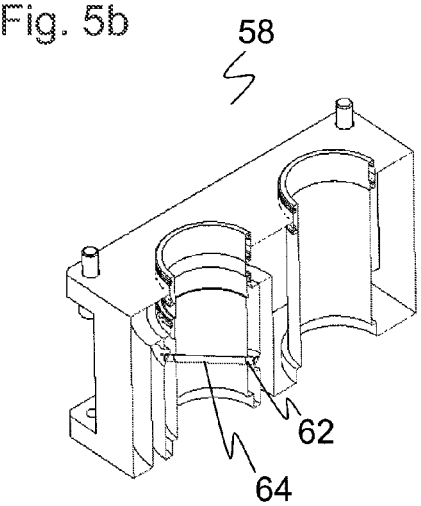
Figure 6A:
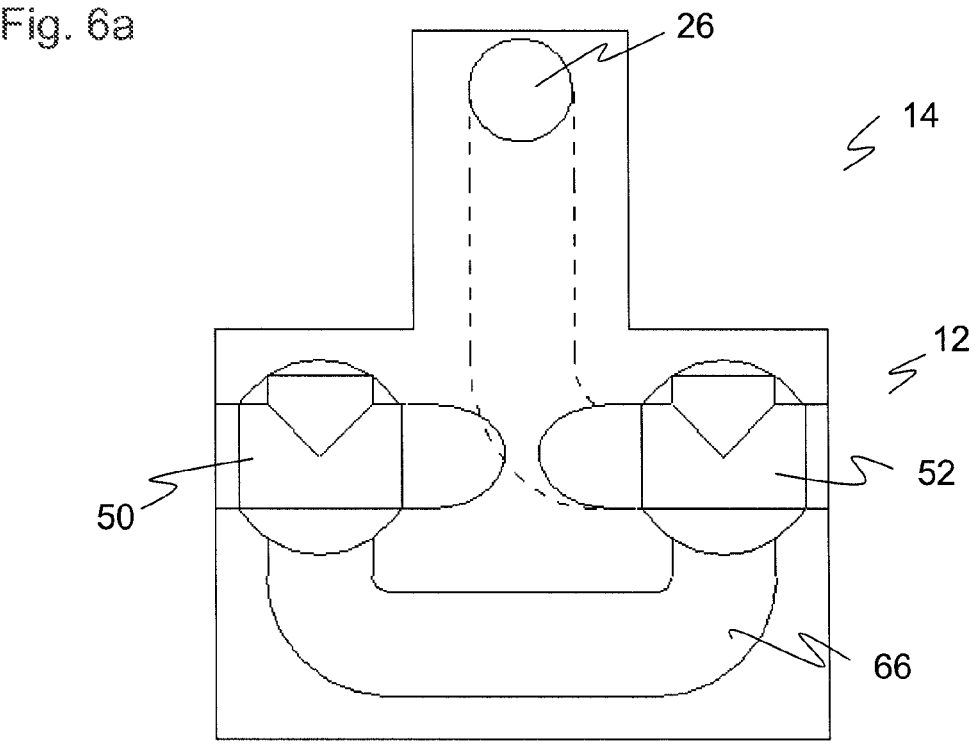
Figure 6B:
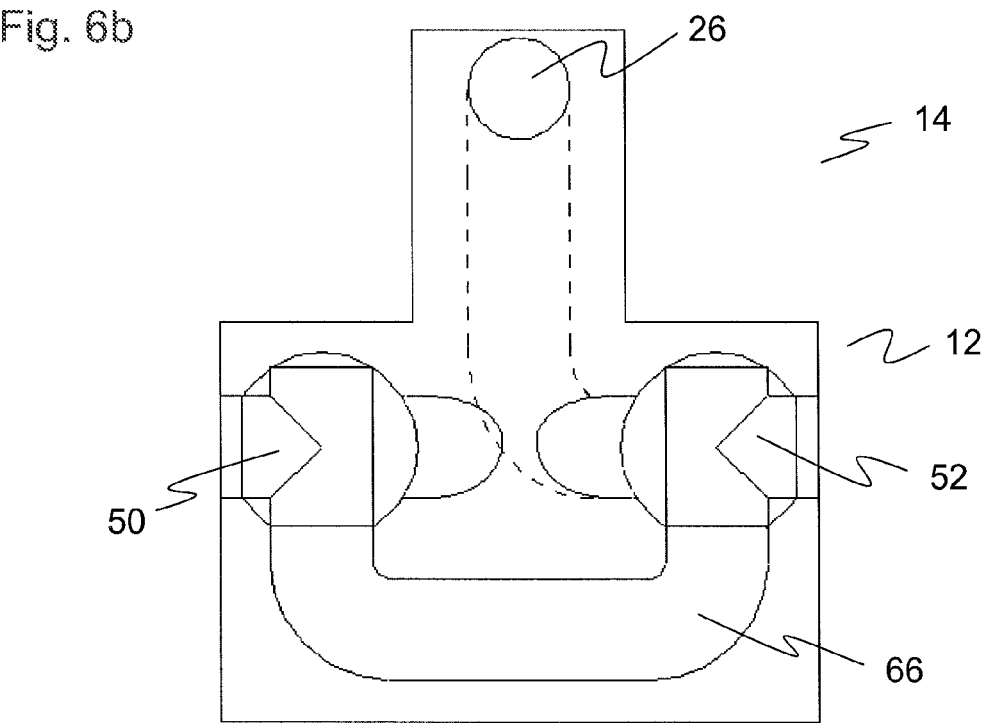

The invention will be described in detail in the following also in view of further features and advantages by way of example with reference to embodiments and with reference to the submitted drawing. The Figures of the drawing show in:

FIG. 1a a three-dimensional outer view of a first embodiment of an ultrasonic measurement apparatus in accordance with the invention;

FIG. 1b a longitudinal section of the ultrasonic measurement apparatus in accordance with FIG. 1a;

FIG. 1c a cross-section of the ultrasonic measurement apparatus in accordance with FIG. 1a in the viewing direction onto a base piece;

FIG. 1d a cross-section analog to FIG. 1d with an opposing viewing direction onto a measurement section;

FIG. 1e a sectional illustration of the ultrasonic measurement apparatus in accordance with FIG. 1a transverse to a known flow direction of the fluid;

FIG. 2a a three-dimensional outer view of a second embodiment of an ultrasonic measurement apparatus in accordance with the invention having a bypass;

FIG. 2b a longitudinal section of the ultrasonic measurement apparatus in accordance with FIG. 2a, FIG. 2c a sectional illustration of the ultrasonic measurement apparatus in accordance with FIG. 2a transverse to a main flow direction of the fluid;

FIG. 3a a three-dimensional outer view of a second embodiment of an ultrasonic measurement apparatus in accordance with the invention having a bypass and a reference measurement section;

FIG. 3b a longitudinal section of the ultrasonic measurement apparatus in accordance with FIG. 3a;

FIG. 3c a sectional illustration of the ultrasonic measurement apparatus in accordance with FIG. 3a transverse to a main flow direction of the fluid;

FIG. 4a a three-dimensional outer view of a bypass module;

FIG. 4b a longitudinal section through the bypass module in accordance with FIG. 4a;

FIG. 5a a three-dimensional outer view of a calibration module;

FIG. 5b a longitudinal section through the bypass module in accordance with FIG. 5a;

FIG. 6a a sectional illustration of a base piece having an integrated bypass line, wherein the bypass line is closed and the fluid flows through the measurement section;

FIG. 6b a sectional illustration in accordance with FIG. 6a for an open bypass line and a pressure-less measurement section;

FIG. 7 a common arrangement of two ultrasonic transducers transverse to a flow direction of a fluid for the explanation of the measurement principle; and FIG. 8 a common pipeline arrangement having a redundant pipe supply for deflecting the fluid during an exchange of an ultrasonic measurement apparatus.

FIG. 1 shows a first embodiment of an ultrasonic measurement apparatus 10 in accordance with the invention in different views. In this respect FIG. 1a is a three-dimensional outer view, FIG. 1b is a longitudinal section, FIG. 1c is a cross-section in the viewing direction down onto a base piece 12, FIG. 1d is a cross-section in the viewing direction upwards onto a measurement module 14 and FIG. 1e is a sectional illustration transverse to a main flow direction, i.e. the longitudinal axis of the base piece 12.

The base piece 12 has flange regions 16 by means of which it is mounted into an existing pipeline in which it replaces a corresponding pipeline section. Alternatively, also a different attachment means, such as a thread can be provided. A fluid flows in the pipeline in its axial direction which is referred to as the main flow direction, for example, natural gas flows in a gas pipeline. With the aid of a releasable connection 18 the measurement module 14 is mounted onto the base piece 18. In an alternative embodiment base piece 18 and measurement 14 can also be formed as one piece.

The ultrasonic measurement apparatus 10 shifts the measurement from the pipeline into an axis transverse to the main flow direction and, in particular perpendicular to the main flow direction. For this reason the flow is supplied without abrupt changes of direction and without cross-sectional constrictions in a loop, as is respectively indicated in the FIGS. 1a-e by means of an arrow and will be described in detail in the following.

The inflowing fluid is deflected in a first deflector 20 from the main flow direction about 90° sidewise and upwardly in the base piece 12 and exits from the base piece 12 via a first opening 22. It flows through a first straight partial section 24 and is subsequently deflected in a 180° arc 26 into the opposite direction in which it passes the second straight partial region 28 which is arranged parallel to the first partial region 24. The fluid then reenters into the base piece 12 through a second opening 30 beside the first opening 22 where it is deflected by a second deflector 32 again by 90° sidewise downwardly back into the main flow direction and thus leaves the ultrasonic measurement apparatus 10 into the pipeline.

A flow rectifier 34 is arranged in the first straight partial region 24 in the measurement module 14. The flow rectifier 34 is configured in a manner known per se and ensures that in the inflow a uniformed flow is formed and enters into the arc 26. The parallel second partial region 28 more specifically the anti-parallel second partial region 28 includes an ultrasonic measurement zone 36 in which two pairs of associated ultrasonic transducers 38 respectively span an ultrasonic measurement path 40. In principle, also a pair of ultrasonic transducers 38 with only one measurement path 40 can be used, but for reasons of standardization typically at least two measurement paths 40 are used. Further measurement paths 40 are plausible to further improve the measurement accuracy for remaining discrepancies in the flow. A non-illustrated evaluation unit which is arranged, for example, as a part of a measurement module 14 at the ultrasonic transducer 38 or in the outer wall of the measurement module 14, generates ultrasound and evaluates the received ultrasonic signals in accordance with the method described in the introduction and from a propagation time difference determines the flow velocity of the fluid.

In all flow regions sharp changes of direction and flow constrictions are prevented. This is also true for the region of the arc 26 in which the flow is supplied behind the flow rectifier 34 back to the ultrasonic measurement zone 36. However, it is advantageous to provide the inner wall of the arc 26 with the illustrated particular wall contour 42. The wall contour 42 initially has a flat partial region before it merges into an arc and thereby forms a small projection. This generates a specific flow fall-off in a region uncritical for the ultrasonic measurement. Thereby an undesired flow fall-off within or close to the ultrasonic measurement zone 36 is avoided and thus the measurement is further stabilized.

FIG. 2 shows a further embodiment of the ultrasonic measurement apparatus 10 in accordance with the invention. In this respect FIG. 2a is a three-dimensional outer view, FIG. 2b is a longitudinal section and FIG. 2c is a sectional illustration transverse to the main flow direction. Here and in the following the same reference numerals refer to the same features or features corresponding to one another.

In the embodiment in accordance with FIG. 1, the measurement module 14 is the only add-on module. In contrast hereto, the embodiment in accordance with FIG. 2 has a bypass module 44 as a further add-on module, which is mountable between the base piece 12 and the measurement module 14. Initially nothing is changed by the bypass module 44 with regard to the flow supply and to the loop, as the bypass module 44 includes two extension pieces 46, 48 for the inflow and the outflow. In a basic position the bypass module 44 connects the openings 22, 30 of the base piece 12 in a pressure-sealed manner to the two straight partial regions 24, 28 of the measurement module 14 via the connection pieces 46, 48.

The bypass module 44 is illustrated in FIG. 4a in a three-dimensional view and in FIG. 4b is further illustrated in a separate manner in a longitudinal section. A bypass deflector 50, 52 respectively configured as a sphere perforated in T-shape forms in a first position, in a straight flow path the connection pieces 46, 48. Through rotation of the sphere the bypass deflectors 50, 52 are transferred into a second position in a manner similar to the functionality of a three-way spherical tap and in its place form a transverse line. This is, for example, recognizable in FIG. 4b, wherein the bypass deflector 50, illustrated on the left, is rotated about 90° against the clock-wise direction and the bypass deflector 52, illustrated on the right, is rotated in the clock-wise direction by 90°. If the transverse line is opened in the second position, then the flow path in the loop and thus to the measurement module 14 is blocked and the fluid instead flows through the transverse line serving as a bypass. The situation corresponding to the second position is illustrated by a dotted arrow in FIG. 2c while the illustration otherwise corresponds to the first position indicated by the solid arrow. Seals arranged at the spheres of the bypass deflectors 50, 52 prevent the flow exit into the respectively blocked passage.

For a simplified synchronous actuation of the bypass deflectors 50, 52 a lever 54 and a mechanical coupling 56 of the two bypass deflectors 50, 52 is provided. This coupling is shown purely by way of example as four cogwheels in the Figures, to illustrate that the coupling 56 reverses the rotary direction.

To now exchange the measurement module 14, it is sufficient to actuate the lever 54 and thus to supply the flow of the fluid through the transverse line in the second position of the bypass deflectors 50, 52. The measurement module 14 becomes pressure-less thereby and can be exchanged without a problem, for example, with a pre-calibrated exchange measurement module. Following the exchange the lever 54 is again actuated so that the first position of the bypass deflectors 50, 52 is restored and the fluid can be supplied again via the loop through the ultrasonic measurement zone 36. The fluid flow must not be interrupted at any point during the exchange.

FIG. 3 shows a further embodiment of the ultrasonic measurement apparatus 10 in accordance with the invention. In this respect, FIG. 3a is a three-dimensional outer view, FIG. 3b a longitudinal section and FIG. 3c a sectional illustration transverse to the main flow direction.

In contrast to the embodiment in accordance with FIG. 2 a further add-on module configured as a calibration module 58 is mounted between the bypass module 44 and the measurement module 14. FIG. 5a separately shows the calibration module 58 in a three-dimensional view and FIG. 5b shows a corresponding longitudinal section.

The calibration module 58 has its own ultrasonic measurement zone 60 in which a pair of ultrasonic transducers 62 span a measurement path 64. Additional ultrasonic transducers and thus additional measurement paths are also possible here. The calibration module serves for delivering further measurement values for the flow velocity as a reference to the measurement module 14. These measurement values can be used for the plausibilisation of the measurement module 14 or for its calibration.

The calibration module 58 is only an example of the advantageous use of further add-on modules. For example, in a further embodiment it is plausible to mount an additional measurement module between the base piece 12 and the bypass module 44 which delivers measurement values while the flow is supplied through the transverse line of the bypass module 44 in the second position of the bypass deflectors 50, 52. Thus, during the exchange or the maintenance of the measurement module data on the flow velocity can still be provided. Different measurement modules for different pressures, different accuracy requirements, measurement zones or compositions of the fluid to be measured can be provided in a different alternative embodiment.

FIG. 6 shows an alternative variant of a bypass line. In this respect, the bypass line is not provided in its own bypass module 44, but is integrated into the base piece 12. FIG. 6a shows the situation during the measurement operation. The fluid flows through the base piece 12 into the measurement module 14 and back through the base piece 12 into the pipeline. The bypass line 66 in this respect remains unused.

FIG. 6b illustrates the alternative situation during maintenance works. The measurement module 14 is pressure-less and can be exchanged without danger and switching off of the flow of the fluid. While the fluid flows through the bypass line 66. Similar to the case of the bypass module 44, bypass deflectors 50, 52 are provided which switch between the two modes of operation of the bypass line 66 on the principle of a three-way tap.

The invention claimed is:

1. An ultrasonic measurement apparatus (10) for measuring the flow velocity of a fluid which flows in a pipeline in a main flow direction, wherein the ultrasonic measurement apparatus (10) has an ultrasonic measurement zone (36) with at least a pair of ultrasonic transducers (38), an evaluation unit for determining the flow velocity from a propagation time difference of ultrasound transmitted and received with and against the flow, as well as a deflection unit, by means of which the fluid from the main flow direction is deflectable and suppliable to the ultrasonic measurement zone (36), wherein the deflection unit (20, 26, 32) forms a loop having an inflow region (24) and an outflow region (28), wherein the ultrasonic measurement zone (36) is provided in the outflow region so that the flow is reproducibly stabilized on entry into the ultrasonic measurement zone (36) such that transmitted and received ultrasound have at least one component in a direction transverse to the flow.

2. An ultrasonic measurement apparatus (10) in accordance with claim 1, wherein the loop has a first deflector (20), an arc (26), and a second deflector (32) so that fluid from the main flow direction is deflectable into the inflow region (24) by means of the first deflector (20), is deflectable from there into the outflow region (28) by means of the arc (26) and subsequently is deflectable back into the main flow direction by means of the second deflector (32) wherein, in particular, the first deflector (20) and the second deflector (32) form a right angle and the arc (26) forms an angle of 180.degree.

3. An ultrasonic measurement apparatus (10) in accordance with claim 2, wherein the inflow region and the outflow region each have a partial region (24, 28) arranged next to one another and are aligned in parallel to one another, wherein, in particular a plane, which includes both straight partial regions (24, 28), is perpendicular to the main flow direction.

4. An ultrasonic measurement apparatus (10) in accordance with claim 2, wherein the loop is designed smooth and without sharp changes in direction or constrictions, wherein, in particular, the arc (26) has a wall contour (42) which causes a specific flow break away in a zone uncritical for the ultrasonic measurement.

5. An ultrasonic measurement apparatus (10) in accordance with claim 2, wherein a flow rectifier (34) is provided in the inflow region and/or in the outflow region.

6. An ultrasonic measurement apparatus (10) in accordance with claim 2, with a pipe shaped base piece (12) having connection regions (16), in particular flanges for the pipeline which includes the first deflector (20) and the second deflector (32).

7. An ultrasonic measurement apparatus (10) in accordance with claim 2, having at least one add-on module (14, 44, 58) which each have an extension piece for the inflow region and an extension piece for the outflow region and which are connectable to the base piece (12) or to any other add-on module (14, 44, 58) and are separable from the base piece (12) or from the other add-on module (14, 44, 58), wherein a final add-on module (14, 44, 58) includes the arc (26).

8. An ultrasonic measurement apparatus (10) in accordance with claim 7, which includes at least one add-on module designed as a measurement module (14) having the ultrasonic measurement zone (36).

9. An ultrasonic measurement apparatus (10) in accordance with claim 8, which has the add-on module configured as a calibration module (58) with at least one pair of ultrasonic transducers (62) for a plausibility check or calibration of the measurement values of the ultrasonic measurement zone (36).

10. An ultrasonic measurement apparatus (10) in accordance with claim 7, which has an add-on module configured as a bypass module (44) having a transverse line between the inflow region and the outflow region or a transverse line integrated into the base piece (12), wherein a bypass deflector (50, 52) is provided which in a position selectively closes the flow to the transverse line and from the transverse line and releases the flow to the inflow area and from the outflow area and in another position selectively closes the flow to the inflow region and from the outflow region and releases the flow to the transverse line and from the transverse line.

11. An ultrasonic measurement apparatus (10) in accordance with claim 10, wherein the bypass deflector (50, 52) is configured on the principle of a three way tap, in particular has two spheres perforated in T-shape with seals which are coupled amongst one another and are thus commonly transferrable from the one position into the other position.

12. A method for measuring the flow velocity of a fluid which flows in a pipeline in a main flow direction, comprising;
- deflecting the fluid from the main flow direction,
- supplying the fluid to the ultrasonic measurement zone (36) for the measurement, wherein the ultrasonic measurement takes place whilst the fluid is deflected such that it flows in a loop, and
- determining the flow velocity from a propagation time difference of ultrasound transmitted and received with and against the flow from a pair of ultrasonic transducers (38) in an ultrasonic measurement zone (36),
- the loop having an inflow region (24) and an outflow region (28), and wherein the ultrasonic measurement zone (36) is provided in the outflow region so that the flow is reproducibly stabilized on entry into the ultrasonic measurement zone (36) such that transmitted and received ultrasound ha at least one component in a direction transverse to the flow.

\* \* \* \* \*